(12) United States Patent
Avramopoulos et al.

(10) Patent No.: US 7,409,550 B2
(45) Date of Patent: Aug. 5, 2008

(54) METHOD FOR BINDING NETWORKED DEVICES

(75) Inventors: Ioannis Avramopoulos, Cambridge, MA (US); Johnas I. Cukier, Shrewsbury, MA (US); Ghulam Bhatti, Union, NJ (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 765 days.

(21) Appl. No.: 10/918,926

(22) Filed: Aug. 16, 2004

(65) Prior Publication Data

US 2006/0036860 A1    Feb. 16, 2006

(51) Int. Cl.
    *H04L 9/14*    (2006.01)
(52) U.S. Cl. .................. 713/171; 713/182; 380/270
(58) Field of Classification Search .......... 380/270, 380/259; 713/151, 155, 168, 194, 171, 169, 713/182, 150; 370/310.1
    See application file for complete search history.

(56) References Cited

U.S. PATENT DOCUMENTS

| | | | | |
|---|---|---|---|---|
| 4,606,072 | A * | 8/1986 | Martin et al. | 725/151 |
| 4,646,300 | A * | 2/1987 | Goodman et al. | 714/749 |
| 5,216,715 | A * | 6/1993 | Markwitz | 713/171 |
| 6,119,033 | A * | 9/2000 | Spigelman et al. | 600/426 |
| 6,185,685 | B1 * | 2/2001 | Morgan et al. | 713/183 |
| 6,631,841 | B2 * | 10/2003 | Roberts et al. | 235/440 |
| 6,816,970 | B2 * | 11/2004 | Morgan et al. | 713/183 |
| 7,017,180 | B1 * | 3/2006 | Nagasaka | 726/3 |
| 2002/0018458 | A1 * | 2/2002 | Aiello et al. | 370/348 |
| 2002/0178283 | A1 * | 11/2002 | Robinson | 709/236 |
| 2003/0210789 | A1 * | 11/2003 | Farnham et al. | 380/270 |
| 2004/0162983 | A1 * | 8/2004 | Gotoh et al. | 713/171 |
| 2005/0232277 | A1 * | 10/2005 | See | 370/395.52 |
| 2006/0148402 | A1 * | 7/2006 | Hagiwara | 455/41.1 |

FOREIGN PATENT DOCUMENTS

EP        349967 A  *  1/1990

OTHER PUBLICATIONS

Mark Corner and Brian Noble. Zero-interaction authentication. In Proceedings of the 8th International Conference Mobile Computing and Networking, Atlanta, GA, Sep. 2002.

(Continued)

*Primary Examiner*—Gilberto Barron, Jr.
*Assistant Examiner*—Hadi Armouche
(74) *Attorney, Agent, or Firm*—Dirk Brinkman; Clifton D. Mueller; Gene V. Vinokur

(57) ABSTRACT

A method binds devices connected by a wireless network by setting a first timeout in a master device. A key exchange is performed between the master and a slave device. The key exchange is terminated if the first timeout expires and the key exchange is incomplete. Then, a second timeout is set in the master device and a third timeout is set in the slave device if the key exchange is complete. A binding to the slave device is established in the master device if the master device receives a response from the slave device after the second time expires. Otherwise the slave device is disabled. A binding to the master device is established in the slave device if the third timeout expires and there is only one key exchange detected by the slave device.

13 Claims, 3 Drawing Sheets

OTHER PUBLICATIONS

H. Krawczyk, M. Bellare, and R. Canetti. HMAC: Keyed-Hashing for Message Authentication, Feb. 1997. Internet RFC 2104.

Hugo Krawczyk. The order of encryption and authentication for protecting communications (or: How secure is ssl?). In Proceedings of CRYPTO 2001, Santa Barbara, CA, Aug. 2001.

Roger Needham and Michael Schroeder. Using encryption of authentication in large networks of computers. Communications of the ACM, 21 (12) :933-999, Dec. 1978.

Clifford Neuman and Theodore Ts'o. Kerberos: An authentication service for computer networks. IEEE Communications Magazine, 32 (9) :33-38, Sep. 1994.

Adrian Perrig, Robert Szewczyk, J.D. Tygar, Victor Wen, and David E. Culler. Spins: Security protocols for sensor networks. Journal of Wireless Networks, 8 (5) :521-534, Sep. 2002.

Asad Amir Pirzada and Chris McDonald. Kerberos assisted authentication in mobile ad hoc networks. In Proceedings of the 27th Australasian Computer Conference, Dunedin, New Zealand, 2004.

Frank Stajano and Ross Anderson. The resurrecting duckling: Security issues for ubiquitous computing. IEEE Computer Magazine, 35 (4) :22-26, Apr. 2002.

Tom Yu, Sam Hartman, and Kenneth Raeburn. The perils of unauthenticated encryption: Kerberos 4. In Proceedings of Network and Distributed System Security Symposium, NDSS '04, San Diego, CA, Feb. 2004.

* cited by examiner

100

200

300

METHOD FOR BINDING NETWORKED DEVICES

FIELD OF THE INVENTION

The present invention relates generally to cryptography and, more particularly, to establishing cryptographic keys for devices in a network.

BACKGROUND OF THE INVENTION

Cryptography is used in applications that require secure transmission and storage of data. Secure transmission is needed between computers, telephones, facsimile machines, sensors, and other devices. Secure storage is required for memories, disks, and tapes. In all cases, the principal goal of cryptography is to prevent unauthorized access to the data.

Generally, cryptography uses two types of keys and corresponding protocols: symmetric and asymmetric. In symmetric cryptography, the identical key is used for encrypting and decrypting. In this case, both the encryptor and decryptor know the key. Because symmetric cryptography relies on the secrecy of the key, the key can be comparatively small, e.g., 128 bits or smaller. Symmetric protocols are relatively fast and easy to implement. The main problem with symmetric cryptography is to provide a secure mechanism for key exchange, which is always subject to attack by adversaries.

In asymmetric cryptography, a public key is used for encrypting and a private key is used for decrypting. The security of public cryptography relies on the difficulty of deriving the private key from the public key. Therefore, the public key must be comparatively large, e.g., 1024 bits or more.

The computational complexity and power consumption of asymmetric cryptography is several orders of magnitude greater than that for symmetric cryptography. Therefore, asymmetric cryptography is problematic for small, battery operated and reduced functionality devices (RFDs), such as personal digital assistants (PDAs), laptops, cellular telephones, and wireless environment sensors. In addition, because public keys are available to imposters, authentication is required.

Protocols for authenticating key exchange communications are described by Needham and Schroeder, "Using encryption of authentication in large networks of computers," Communications of the ACM, 21(12), pp. 993-999, December 1978. In the Needham-Schroeder protocol, an authenticator (A) authenticates a master device (M) and a slave device (S) using a master key (MK), a slave key (SK), and a symmetric protocol. An encryption of a message X with key K is denoted by $X^{\{K\}}$.

The exchanges of the symmetric Needham-Schroeder key exchange protocol use the following messages:

| | | |
|---|---|---|
| (1) M → A | M, S, $R_M$ | |
| (2) A → M | $\{R_M, S, MK, \{MK, M\}^{\{SK\}}\}^{\{MK\}}$ | |
| (3) M → S | $\{MK, M\}^{\{SK\}}$ | |
| (4) S → M | $\{R_S\}^{\{MK\}}$ | |
| (5) M → S | $\{R_S - 1\}^{\{MK\}}$ | |

In the first message (1), the master device M contacts the authenticator A to request a master key MK for a slave device S. The message includes a random number $R_M$ to protect against replay attacks.

The authenticator A replies with a message (2) that includes the random number $R_M$, the slave device identifier S, the master key MK and a 'ticket' $\{MK, M\}^{\{SK\}}$, which includes the master key MK and the master device identifier M. The ticket is encrypted with the slave key SK. The entire message (2) is encrypted with the master key MK. The master device M decrypts the message (2), stores the master key MK, and forwards the ticket to the slave device S in message (3). The ticket is encrypted with the slave key SK.

On receipt of the ticket, the slave device decrypts the ticket using the slave key SK, and stores the master key. In the fourth message, the slave device sends a random number $R_S$ encrypted with the master key MK to the master device. In response, in message (5), the master device M sends the random number with $R_S-1$ encrypted with the master key. The fourth and fifth messages also prevent replay attacks.

The Needham-Schroeder protocol for authentication is not secure because it can be subject to attacks by imposters, Yu, et al., "The perils of unauthenticated encryption: Kerberos 4," Proceedings of Network and Distributed System Security Symposium, NDSS '04, February 2004.

Another prior art authentication system used in fixed infrastructure networks, is based on the Needham-Schroeder key exchange protocol, see, Neuman, et al., "Kerberos: An authentication service for computer networks," IEEE Communications Magazine, 32(9): pp. 33-38, September 1994. That method also relies in previously established keys between users of the system.

Pirzada et al., describe an authentication system for mobile ad hoc networks, Pirzada, et al., "Kerberos assisted authentication in mobile ad hoc networks," Proceedings of the 27th Australasian Computer Conference, January, 2004.

A transient association authentication method in sensor networks and a security policy for execution of an authentication method is described by Stajano et al., "The resurrecting duckling: Security issues for ubiquitous computing," IEEE Computer Magazine, 35(4), pp. 22-26, April 2002. There, master keys are imprinted on devices using either an out-of-band communication mechanism, if it is available, or by transmitting the master keys using a wireless medium. The latter method is vulnerable to an adversary that is eavesdropping on the medium. In that policy, a device recognizes a master as an owner of the key that was imprinted on the device, which makes the system vulnerable to an imposter that imprints a key prior to the owner having access to the device. The resurrecting duckling is well-suited for environments where the owner of the devices does not have on-line access. However, it desired to provide a secure environment for networked sensors where the owner does have on-line access.

The SPINS suite of security protocols for sensor networks described by Perrig et al., "Spins: Security protocols for sensor networks," Journal of Wireless Networks, 8(5), pp. 521-534, September 2002. In SPINS, keys are shared between sensors and a base stations. However, SPINS does not describe how the keys are exchanged in the first place.

Therefore, it is desired to provide an authenticated key exchange method that overcomes the problems of the prior art.

SUMMARY OF THE INVENTION

A method binds devices connected by a wireless network. A first timeout is set in a master device, and a key exchange is performed between the master device and a slave device. The key exchange is terminated if the first timeout expires and the key exchange is incomplete.

Then, a second timeout is set in the master device and a third timeout is set in the slave device if the key exchange is complete.

A binding to the slave device is established in the master device if the master device receives a response from the slave device after the second time expires, and otherwise the slave device is disabled.

A binding to the master device is established in the slave device if the third timeout expires and there is only one key exchange detected by the slave device, and otherwise further operations of the slave device are blocked if more than one key exchanges are detected by the slave device.

DETAILED DESCRIPTION OF THE PREFERRED EMBODIMENT

Network Structure

Figure 1:
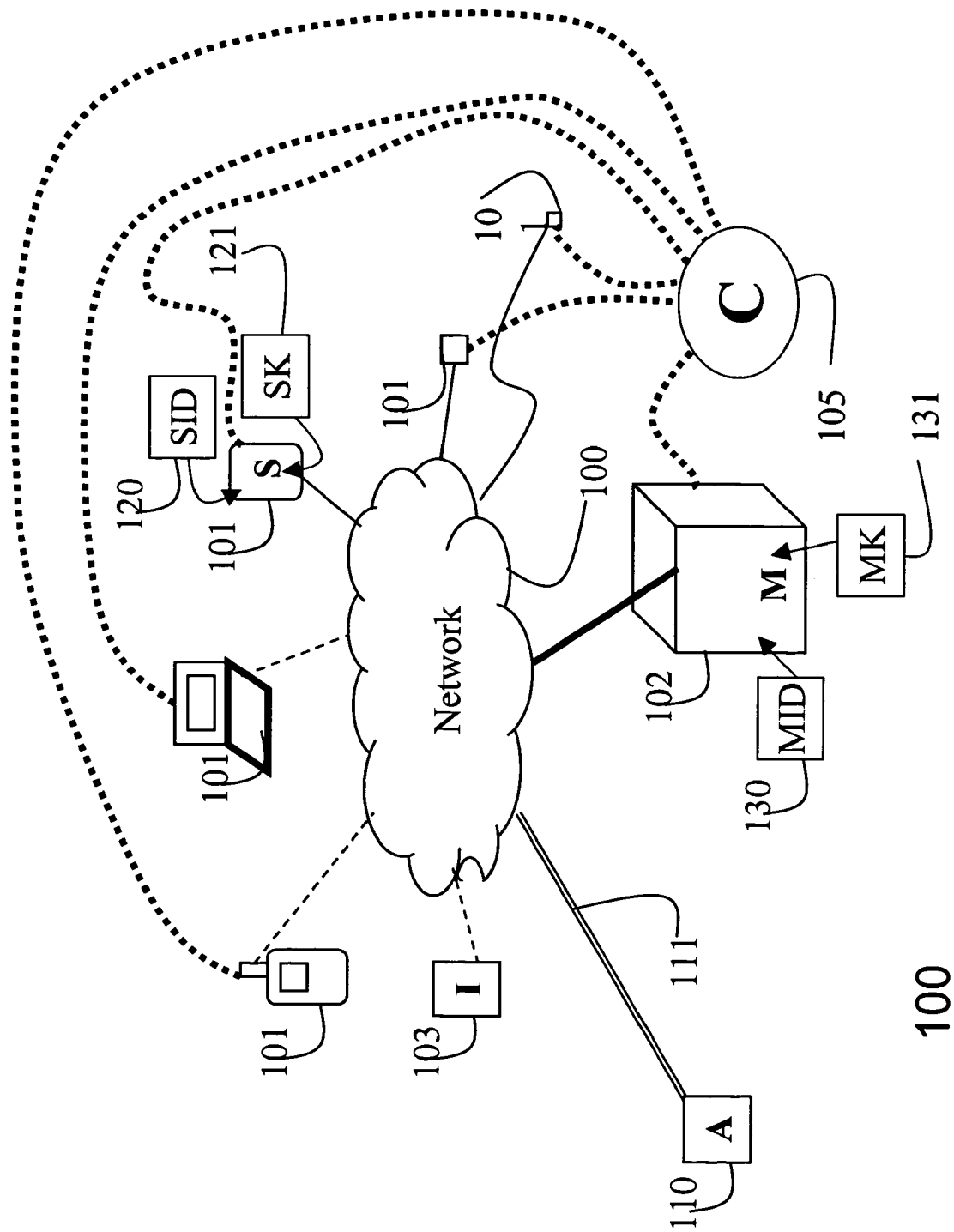
FIG. 1 is a block diagram of a network according to the invention.
Figure 2:
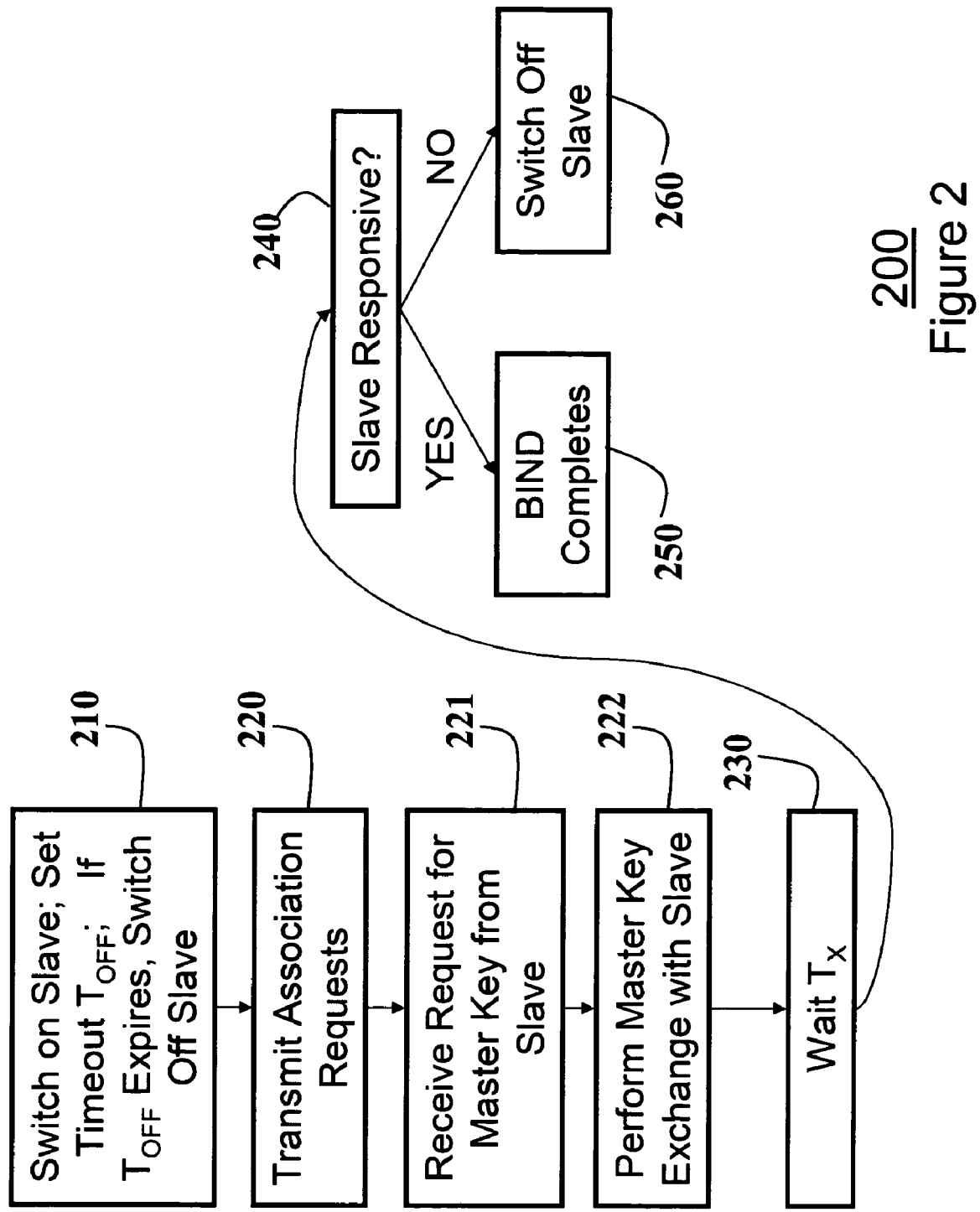
FIG. 2 is a flow diagram of a method according to the invention operating in a master device.
Figure 3:
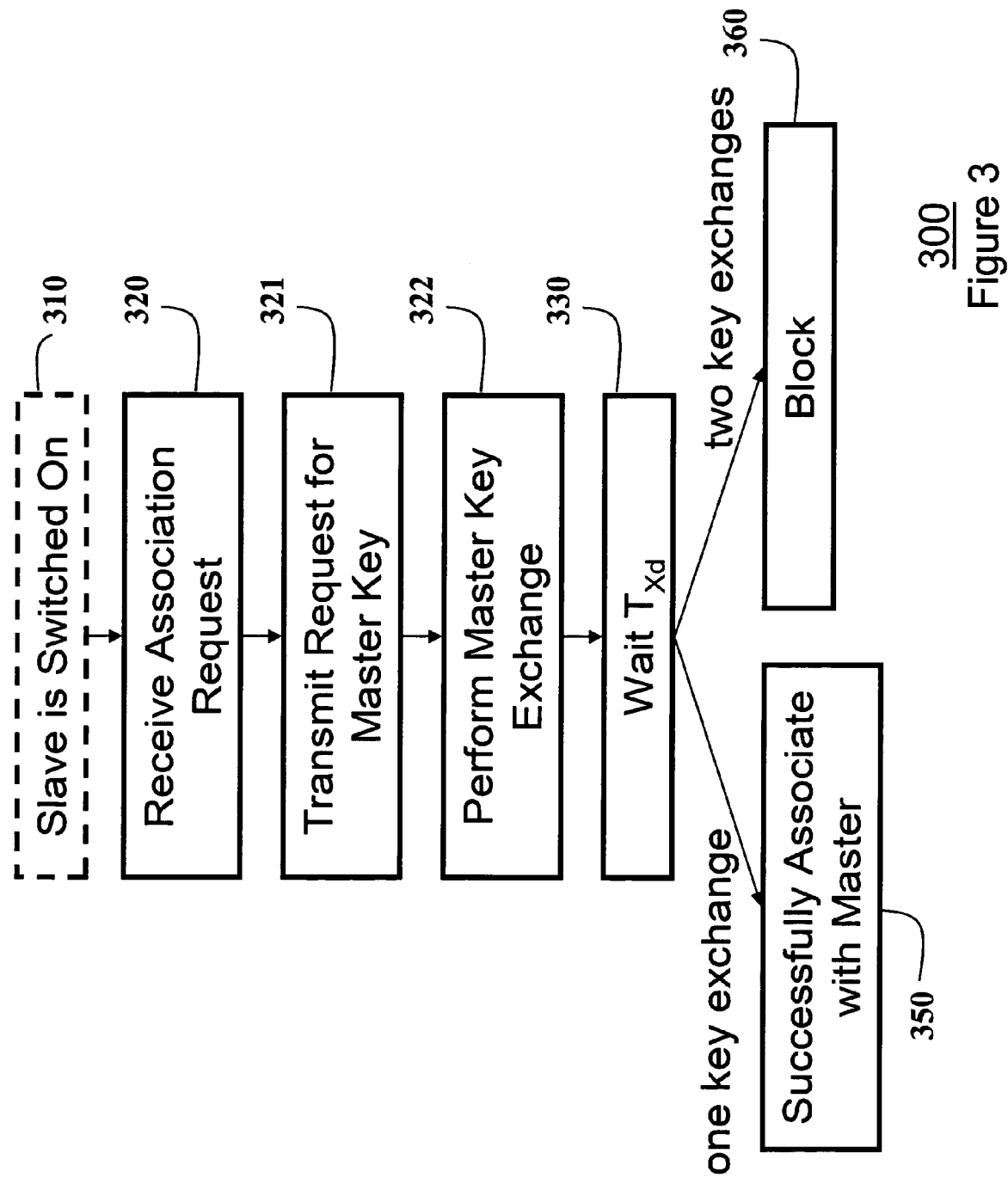
FIG. 3 is a flow diagram of a method according to the invention operating in a slave device.

FIG. 1 shows a network 100 that uses our invention. FIGS. 2 and 3 show methods 200 and 300 for binding a master device and a slave device according to our invention. By binding, we specifically mean exchanging cryptography keys between identified devices. Furthermore, an authenticator is notified of the binding to prevent imposters from compromising the security of the network. By imposter, we mean any adversary, such as a thief, attempting to tamper with the devices, or to gain access to data stored in the devices or communicated between the devices.

The network 100 includes reduced functionality (RFD) or slave devices (S) 101 coupled to one or more full functionality (FFD) or master devices (M) 102. A slave device can be a cellular telephone, a laptop, a PDA, or a wireless sensor. The master device can be any type of computer system, such as a desktop system, a laptop, or a PDA.

Associated with each master device 102 and slave device 101 is a controller (C) 105. The controller is the only means capable of enabling or disabling operations of the devices as described herein. There can be a single controller for all devices. For example, the controller is the user that has physical control of the devices while the method according to the invention is performed.

An authenticator (A) 110 is connected to the network by a secure channel 111. The authenticator also stores slave keys (SK) of the slave devices 101. Authentication as described herein can be initiated by either a slave or a master. The network can also include an imposter (I) 103. For example, the imposter attempts to acquire control of any of the devices remotely before or while the method of the invention is performed. In this case, the invention ensures that the imposter 103 cannot remotely operate any of the devices, via the wireless network, so as to compromise the devices or the data of the devices. The imposter may also be a thief that has acquired physical control of any of the devices after the method of the invention is performed. In this case, the method ensures that the imposter 103 cannot operate any of the devices, even if the imposter has physical access to the device.

Each S 101 includes a stored slave identifier (SID) 120 and a slave key (SK) 121. Each M 102 can include a master identifier (MID) 130 and a master key (MK) 131. The IDs can be stored by a manufacturer, the controller, or some other trusted party.

It is the object of the invention to perform a key exchange between the slave and master, and to prevent keys to be established or used by the imposter.

Method Operation

FIGS. 2 and 3 show the operation of the method according to the invention in the master and slave, respectively. The method can begin by authenticator 110 proving its identify to the master 102. This optional step is used to prevent the imposter from interceding in the binding process, or from acting as the authenticator.

In step 210, the controller enables the master and slave for operation. For example, a user turns on the master, and in step 310 the slave is turned on. The master sets a first timeout $T_{OFF}$ to successfully complete the key exchange with the slave. If $T_{OFF}$ expires before the key exchange is complete, then the key exchange is terminated.

In steps 220-222 and 320-322, the master and slave perform the key exchange using any known protocol. The key exchange includes transmitting 220 and receiving 320 an association request, transmitting 321 and receiving 221 a master key request, and a master key exchange 222, 322 itself, in the master and slave. As described above, we prefer the Needham-Schroeder key exchange protocol. Either the master or the slave can initiate the request key exchange as shown respectively in FIGS. 2 and 3.

If the key exchange completes, then the master cancels the timeout $T_{OFF}$, sets a second timeout $T_X$ that is longer than $T_{OFF}$, and waits in step 230. The slave sets a third timeout $T_{Xd}$ and waits in step 330.

In step 240, the master determines if the slave responds after the timeout $T_X$ expires. If the slave is responsive, then the binding is complete in the master 250. If the slave is not responsive after the second timeout expires, then the controller disables the slave in step 260, directly or indirectly.

The slave waits 330 for the third timeout to expire. If the timeout $T_{Xd}$ of the slave expires and only one key exchange is detected, then binding also completes in the slave device in step 350 and the slave can exchange data with the master. If the slave detects more than one key exchange from any master, including perhaps, the imposter, then the slave blocks 360 further operation of the slave device, and waits to be disabled by the controller.

The first and third timeouts TOFF and TXd prevent an attack that would give the imposter control of the slave. In this type of attack, the imposter performs a key exchange with the slave and then prevents the slave from communicating with the master by 'jamming' all of the communications between the slave and master, effectively gaining control of the slave. Because TOFF<TXd, the controller has time to disable the slave before the imposter gains control of the slave. This also allows the master to perform the key exchange with the slave in the case that the imposter has performed a prior key exchange, because in this case the slave disables the imposter from gaining control of the slave.

Timeout $T_X$ prevents the master from communicating with the slave before the slave is ready. In summary, $T_{OFF} < T_{Xd} < T_X$ and, thus, $T_{OFF}$ is a lower bound of $T_{Xd}$ and $T_X$. Timeout $T_{OFF}$ is lower bounded by a maximum amount of time that it takes for the master to perform the key exchange after the slave is disabled.

If the network does not allow key exchange for multiple masters because, for example, the network cannot provide routes to multiple masters and then if a slave associates with the imposter, the intended master does not associate with the slave, and the timer $T_{OFF}$ expires before the imposter gains control of the slave.

Detecting Usurpation Attempts on Slave Devices

The invention also provides a method for detecting any attempts by the imposter to usurp the slave. Because the imposter can block communications of the slave, we prefer to detect usurpation in the authenticator. Also, because the preferred key exchange uses the authenticator, it is more convenient to use the authenticator to perform the detection.

One approach to accomplish the detection of usurpation is to maintain a state of the key exchanges in the authenticator. The controller can examine the state and make a determination to disable the slave or not based on the sate of the key exchange. However, if the imposter initiates a key exchange with the authenticator, then the slave and master cannot be bound.

Therefore, the authenticator does not allow a key exchange unless it can be determined that the master and slave can communicate with each other. Therefore, we modify the Needham-Schroeder key exchange protocol as follows:

| | |
|---|---|
| (1) M → A | M, S, $R_M$ |
| (2) A → M | $\{R_M, S, MK, \{MK, M, R_A\}^{\{SK\}}\}^{\{MK\}}$ |
| (3) M → S | $\{MK, M, R_A\}^{\{SK\}}$ |
| (4) S → M | $\{R_s\}^{\{MK\}}, R_A$ |
| (5) M → A | $R_A$ |
| (6) A → M | $\{R_A\}^{\{SK\}}$ |
| (7) M → S | $\{R_s - 1\}^{\{MK\}} \{R_A\}^{\{SK\}}$ |

We use a third random number $R_A$ generated by the authenticator. This random number communicated back and forth between the authenticator, the master, and the slave in messages (2-7) of our modified Needham-Schroeder to prove to the authenticator that the master and slave can indeed communicate with each other.

The acknowledgement $\{R_A\}^{SK}$ from A to S in message (6) indicates that the key exchange is considered completed by the authenticator. The key exchange is considered completed at S when this acknowledgement is received. With this acknowledgement, usurpation attempts can be detected.

With the modified key exchange and the state that is maintained at the authenticator, the master can query the authenticator as to the state of the slave while the binding is in progress. Depending on the state, master can notify the controller to disable the slave.

Terminating a Binding

The master can terminate the binding to establish a new key, or to allow the slave to bind with another master. One way to perform termination is to have the master direct the slave to discard the current master key. However, this way does not protect against an imposter that has compromised the master key, and has instructed the slave to discard the current master key in order to perform a key exchange with the imposter.

The binding can be terminated by an explicit physical operation on the slave that will instruct the slave to discard the current key. However, if the imposter has physical access of the slave, then the slave can be coerced to exchange keys with the imposter, which results in a full compromise of the slave. It should be noted that tampering with the slave by the imposter can be prevented with tamper-resistant hardware.

Therefore, we prevent the imposter from terminating the binding even if the imposter has obtained the master key or physical access to the slave. We do this by notifying the authenticator of the binding. Then, the master can request a disassociation ticket from the authenticator. The disassociation ticket is forwarded to the slave. When the slave receives a disassociation ticket, the slave discards master key. Random numbers are used protect the disassociation ticket from replay attacks.

If the master notifies the authenticator without permission of the slave, then the master could announce arbitrary bindings and obtain disassociation tickets for arbitrary slaves. Therefore, we prefer that the slave notify the binding to the authenticator.

We also prevent the imposter having compromised the master key from obtaining the disassociation ticket for the corresponding slave. That ticket gives the imposter the capability to rekey with the slave, and thus, gain control of the slave. Therefore, the master and the authenticator share a password to obtain the disassociation ticket from the authenticator.

Applications

In one application, the slave devices are sensors placed in an environment. The invention prevents the imposter from gaining control of the sensors or to insert rogue sensors in the environment. In another application the invention is used in a zero-interaction authentication systems to prevent access to secure data.

Sensor Networks

The invention is particularly suited for networks of battery-operated devices with limited processing capabilities, for example, a network of environmental sensors in buildings. The binding according to the invention can be for a single sensor or a cluster of sensors.

Zero-Interaction Authentication (ZIA)

ZIA protects data from unauthorized access, Corner et al., "Zero-interaction authentication," Proceedings of the 8th International Conference Mobile Computing and Networking, September 2002. ZIA only decrypts data if a physical token is sensed near a device. For example, the token is a short-range RF transducer in possession by a user of laptop or cellular telephone. If the device is stolen, the stored data cannot be accessed.

In ZIA, a binding process between the token and the device uses a public key infrastructure that issues certificates of the public keys of the device and the token. The outcome of the binding process is a session key for authenticated and encrypted communication between the token and the device.

The invention can achieve the binding between the token and the device without the overhead of maintaining a public key infrastructure. In this application the token is the master device and the laptop is the slave device. As described above, the token stores the identifier of the slave device, and the slave device stores a device key that is also available to the authenticator.

By following the steps of BIND protocol as described above, the token and the device can establish a master key that can subsequently be used to establish session keys.

EFFECT OF THE INVENTION

The protocol according to the invention enables a key exchange between a master device and a slave device. The key exchange is disabled if an imposter attempts to gain control of the slave device. In contrast to the prior art, the protocol does not require certificates issued by a public key certification authority and does not require the master device to prove its identity in order to gain control of the slave device.

The invention can also detect usurpation of the slave device, and prevents rogue slave devices from being inserted in a network. The invention is also effective for key exchanges are performed using a public key infrastructure without requiring master devices to have such certificates.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for binding devices connected by a wireless network, comprising:

setting a first timeout in a master device;

performing a key exchange between the master device and a slave device;

terminating the key exchange if the first timeout expires and the key exchange is incomplete;

setting a second timeout in the master device and a third timeout in the slave device if the key exchange is complete, in which the first timeout is less than the third timeout and the third timeout is less than the second timeout;

establishing a binding to the slave device in the master device if the master device receives a response from the slave device after the second time expires, and otherwise disabling the slave device; and establishing a binding to the master device in the slave device if the third timeout expires and there is only one key exchange detected by the slave device, and otherwise blocking further operation of the slave device by the slave device if there more than one key exchange is detected by the slave device.

2. The method of claim 1, in which the key exchange uses an authenticator storing a slave key.

3. The method of claim 1, in which the slave device is a battery operated wireless sensor.

4. The method of claim 1, in which the slave device is disabled by a controller.

5. The method of claim 1, in which the slave device includes a slave identifier and the master device includes a master identifier.

6. The method of claim 2, further comprising:

identifying the authenticator to the master device.

7. The method of claim 1, in which the key exchange uses a Needham-Schroeder protocol.

8. The method of claim 1, in which the key exchange includes a series of messages, where M is the master device having an identifier M, S is the slave device having an identifier S, A is the authenticator, $\rightarrow$ is a direction of the message, $R_M$ is a random number generated by the master device, $R_D$ is a random number generated by the slave device, $R_A$ is a random number generated by the authenticator, MK is a master key, SK is a slave key, and a notation $\{.\}^{\{\cdot\}}$ indicates an encryption by a key in the superscript

| | |
|---|---|
| M $\rightarrow$ A | M, S, $R_M$ |
| A $\rightarrow$ M | $\{R_M, S, MK, \{MK, M, R_A\}^{\{SK\}}\}^{\{MK\}}$ |
| M $\rightarrow$ S | $\{MK, M, R_A\}^{\{SK\}}$ |
| S $\rightarrow$ M | $\{R_s\}^{\{MK\}}, R_A$ |
| M $\rightarrow$ A | $R_A$ |
| A $\rightarrow$ M | $\{R_A\}^{\{SK\}}$ |
| M $\rightarrow$ S | $\{R_S - 1\}^{\{MK\}}\{R_A\}^{\{SK\}}$. |

9. The method of claim 2, further comprising:

maintaining a state of the key exchange in the authenticator; and disabling the slave device selectively depending on the state.

10. The method of claim 1, further comprising:

terminating the binding to the salve by the master device.

11. The method of claim 2, further comprising:

notifying the authenticator of the binding to master device and the binding to the slave device;

obtaining a disassociation ticket from the authenticator;

forwarding the disassociation ticket to the slave device; and terminating the binding to the master device by the slave device.

12. The method of claim 11, in which a password is required to obtain the disassociation ticket.

13. The method of claim 1, in which the master device is a wireless token in possession by a user and the slave device is a data storage device operated by the user while wearing the token.

* * * * *